Aug. 17, 1971   C. C. HARDMAN   3,600,227

METHOD OF IMPREGNATING FLEXIBLE METALLIC BATTERY PLAQUES

Filed Sept. 30, 1969

WITNESSES
Theodore F. Wrobel
D. P. Cillo

INVENTOR
Carl C. Hardman
BY Alex Mich, Jr.
ATTORNEY

United States Patent Office 3,600,227
Patented Aug. 17, 1971

3,600,227
METHOD OF IMPREGNATING FLEXIBLE METALLIC BATTERY PLAQUES
Carl C. Hardman, Pittsburgh, Pa., assignor to Westinghouse Electric Corporation, Pittsburgh, Pa.
Filed Sept. 30, 1969, Ser. No. 862,284
Int. Cl. H01m 35/30
U.S. Cl. 136—76                                10 Claims

ABSTRACT OF THE DISCLOSURE

A method of loading active battery material into porous, flexible, metallic battery plaques, comprises the following steps: precipitating nickel hydroxide active material within the plaque by making the plaque cathodic, at a high current density, in an electro-precipitation cell also containing a consumable nickel anode and a solution comprising nickel nitrate; electrochemically oxidizing and reducing the precipitate in caustic formation solution; repeating the electro-precipitation step.

BACKGROUND OF THE INVENTION

In the manufacture of nickel-cadmium batteries, the standard method of preparing the positive plate is to impregnate a porous, rigid, sintered metallic powder plaque with nickel nitrate solution, and then chemically precipitate solid nickel hydroxide with a solution of sodium hydroxide. Because of the non-interconnecting porosity nickel nitrate solutions impregnated into these plaques are difficult to convert into the active hydroxide materials. Since the plaque pores can hold only a limited amount of nickel nitrate solution, which results in only a small amount of nickel hydroxide after precipitation, the impregnation and precipitation steps must be repeated from five to fourteen times. Along with these repeated steps, there must be washing, drying, and quality control checks that require much handling, time, equipment, material, and record keeping.

Feduska, in U.S. application Ser. No. 764,461, filed on Oct. 2, 1968 now abandoned and assigned to the assignee of this invention, solved many of these problems by utilizing flexible, bonded metallic fiber plaques and intermediate oxidizing and reducing of the loaded active material before further impregnation-precipitation steps. This resulted in greater loading of active material into the plaque.

Another known process fills a rigid, sintered metallic powder plaque with active material by immersion in a 10% concentrated nickel nitrate solution and electrolytic deposition of nickel hydroxide active material at a current density of about 1 milliampere (ma.)/sq. cm. After drying to reduce nickel hydroxide active material volume, cathodic polarization can be repeated. This process, though reducing the number of steps required in prior art methods, still requires large consumption of chemicals and is difficult to use with thick battery plaques. The electrodes produced by this process, described by Kandler in U.S. Pat. No. 3,214,355, have an indicated capacity of 1 to 1.5 ampere-hours (ah.)/sq. decimeter for plaque thicknesses of 0.65 mm.

Accordingly, there is a need for faster, lower cost methods of making electrodes with higher active material loadings and resulting improved capacities.

SUMMARY OF THE INVENTION

It is the general object of this invention to provide an improved method of making positive battery electrodes having higher active material loadings and improved capacities.

Briefly, the present invention accomplishes the above object by (1) immersing flexible, expansible, bonded nickel fiber plaques, about 2.0 mm. thick and about 90 percent porous, and a consumable nickel electrode into a saturated, nickel-cobalt nitrate electrolyte solution having a pH between about 0.5–1.1 and a temperature below about 30° C. (2) Making the expansible nickel fiber plaque cathodic, by a series of current pulses, at a current density of between about 20–100 ma./sq. cm., and the consumable nickel electrode anodic, to cause a precipitate build, within the nickel fiber plaque, comprising $Ni(OH)_2$ and small amounts of $Co(OH)_2$. The loaded plaques are then washed and dried preferably without heat. (3) Intermediate electrical charging and discharging of the nickel fiber plaque, containing the precipitate, in alkaline hydroxide solution. This causes the precipitated nickel hydroxide to be oxidized and reduced, with a resulting change in volume. This opens up unfilled pores in the flexible, expansible plaque through active material compacting against and between the flexible nickel fibers of the plaque. The loaded plaques are then washed and dried without heat. (4) Step (2) is then repeated in the nickel-cobalt electrolyte solution. (5) The plaques may then undergo a final electrical charging and discharging step.

BRIEF DESCRIPTION OF THE DRAWINGS

For a better understanding of the nature and objects of the invention reference may be made to the drawings, in which.

PREFERRED EMBODIMENTS OF THE INVENTION

It was found that optimized nickel electrodes for use in my process are possible through careful processing of a bonded metallic fiber skeleton, such as that disclosed in U.S. Pat. 3,127,668, or made by other means such as that disclosed in U.S. application Ser. No. 764,527.

Not all of the parameters disclosed in US. 3,127,668 produce skeletons suitable as the starting point in making electrode plaques. However, the sintered skeleton when modified for my purpose, can be made into metal fiber battery plaques of considerable strength and yet adequate flexibility and expansiveness for the intermediate formation conditioning step hereinafter described. For maximum loading of battery active material, the diameter of the fibers of the plaques must be between about 0.0002 to 0.003 inch, and plaque porosity must be between about 75 and 95 percent i.e. plaque densities falling between 5 to 25 percent of theoretical density.

Generally, the flexible metallic plaque will be composed of fibers such as nickel fibers or nickel plated, bonded steel wool fibers. These fibers are pressed and metallurgically bonded together at many points along their length to give a plaque having flat, planar surface areas. One edge will be coined to a density of about 90 percent to provide a base for spot welded nickel strips which become the electrical lead-tabs for loaded battery plates.

Figure 1:
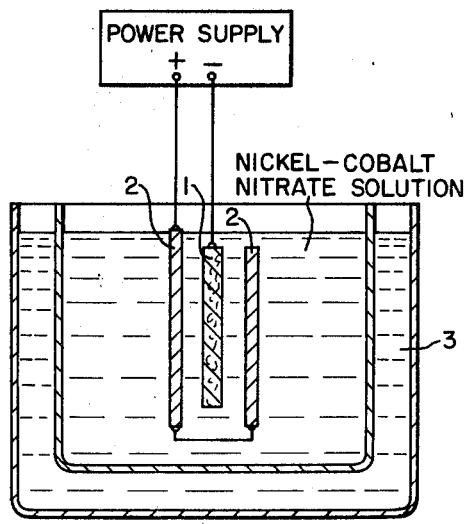
FIG. 1 shows the electro-precipitation apparatus.

Referring now to FIG. 1, the flexible metallic plaques are inserted into the electro-precipitation cell shown. The cell contains a saturated aqueous solution of $$Ni(No_3)_2 \cdot 6H_2O$$

and $CO(NO_3)_2 \cdot 6H_2O$ having a ratio of about 20 parts by weight nickel nitrate to 1 part cobalt nitrate. This electrolyte solution is preferably about 70 to 80% concentrated, on a hydrated basis, having a specific gravity of about 1.5 to 1.6 and a pH of about 0.5–0.8.

It is important to have the electrolyte solution concentration in the electro-precipitation cell between about 50–

80% on a hydrated basis. This gives a pH range of between about 0.5 and 1.1. At these highly acidic pH values, the electrolyte solution is effective in helping to anodically dissolve the consumable anode and in cleaning any oxide initially on the plaque fibers, eliminating the need for first step acid pre-dip. Below about 50% concentration, current efficiency begins to suffer because there are not enough nickel ions in the plaque during electro-precipitation to take advantage of the electrically generated $OH^-$ precipitating agent. Around 85% concentration, the nickel nitrate salt starts to crystallize at the operating temperature of the cell (below about 30° C.).

The cobalt salt in the electrolyte solution is not necessary for my process, but is added to improve utilization of the active material by increasing electrical conductivity and improving cycle life of the electrode.

The metal fiber plaque 1 should be lowered slowly into the electrolyte bath, so as to minimize the amount of air trapped in the pore area of the plaque.

As shown in FIG. 1, a consumable nickel anode 2 is used on both sides of the nickel fiber plaque 1, and placed close to the flat planar surface of the expansible nickel plaque to minimize voltage requirements. This anode can be electrolytically deposited nickel, or other type, such as sulfur depolarized nickel in plate or loose chip form. The former is about 70% consumed and the latter about 90% consumed during the process. Such a consumable anode is an economical and preferred mean or replenishing nickel.

The nickel fiber plaque and consumable nickel anode are connected to the corresponding terminals of a D.C. power supply. The nickel fiber plaque is made cathodic, at a high current density. The preferred current density value is 50 ma./sq. cm. of flat planar surface area, although the current density limits range from about 20 to 100 ma./cm.$^2$. Generally it is preferred to pulse the current to the cathode. It is important to operate within this high-current density range. Below about 20 ma./cm.$^2$, $OH^-$ ions will diffuse from the metal fiber cathode during electro-precipitation, increasing the pH of the electrolyte solution and requiring addition of expensive nitrate solution to maintain the proper acidity for maximizing the process. Above 100 ma./cm.$^2$, the $Ni(OH)_2$ will precipitate superficially, and there will again be $OH^-$ ion diffusion, because nickel is depleted faster than it can be replaced by the electrolyte.

During electro-precipitation, the localized catholyte within the porous nickel fiber plaque cathode, changes from very acid, pH of about 0.5 to 1.1, to basic, pH of about 7.5, at which point $Ni(OH)_2$ can precipitate in situ.

In the electro-precipitation step, the $H^+$ ions are used in the reduction of $NO_3^-$ to $NH_3$ at the cathode or evolved as hydrogen gas at the cathode and a concentration gradient of $OH^-$ ions starts an outward diffusion of $OH^-$ ions from the nickel fiber plaque. The purpose of the high current density used in this invention is to build up the concentration of the $OH^-$ ions within the nickel fiber plaque pores faster than diffusion can remove them. When the solubility product of $Ni(OH)_2$ is exceeded, the $Ni(OH)_2$ precipitates in situ as desired. This precipitation serves to remove the $OH^-$ ions from solution and hence reduces the diffusion tendency.

Because of the high energy input to the cell, the $I^2R$ energy will heat up the electrolyte, which is at an initial temperature of about 10° to 30° C. It is important to keep the electrolyte in the electro-precipitation cell below about 30° C. Above, this value efficiency drops off drastically and the pH value of catholyte within the nickel fiber plaque will be difficult to build up to a basic $OH^-$ precipitating concentration. Maximum current efficiency is achieved in the temperature range of 10–15° C. Since $OH^-$ ion diffusion rate increases with temperature, it is desirable to maintain the cell at initial temperature by means of cooling bath 3 shown in FIG. 1.

After a first current pulse to the cathode, in the elecro-precipitation cell, of about 20 minutes, the nickel ions are depleted and further polarization is ineffective to produce more precipitate. Opening the circuit for a 5 to 10 minute rest period will enable the nickel fiber plaque to become permeated with electrolyte of the same composition and pH as the main bath. A new current pulse of the same magnitude and duration is then started. This pulsing may be repeated any number of times. However, after about 6 pulses of about 20 minutes each, I found that the plaque becomes too filled for further effective loading in that electro-precipitation step. Employing current pulses to the plaque with rest periods therebetween is the preferred method of electro-precipitation. This insures effective loading of active material. The individual pulses may vary widely in time with the preferred period being between about 1 to 40 minutes.

No additives are required to maintain the pH of the electrolyte in the electro-precipitation cell. Nickel ions that are precipitated within the porous metallic fiber plaque are replaced by nickel ions from the consumable nickel anode. This is an important economic consideration, since nickel as sheet metal is about one-half the price of nickel in hydrated nickel nitrate form. Naturally, when the loaded plaques are removed from the electro-precipitation cell, some dragout of electrolyte occurs which is generally replaced by electrolyte of similar composition and pH.

Figure 2:
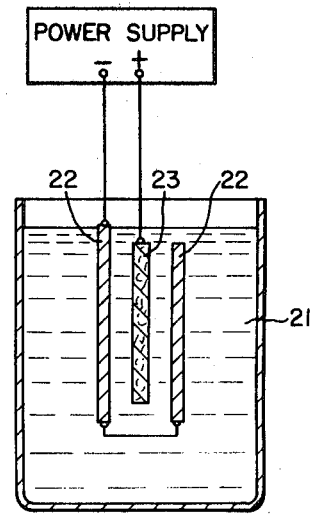
FIG. 2 shows the intermediate charging formation conditioning apparatus.

The nickel fiber plaque is made receptive to further loading by intermediate formation conditioning as shown in FIG. 2 of the drawings. This is an electrochemical oxidation and reduction of active material in caustic formation solution. This process densifies the active material and releases the nitrate that has been trapped by the voluminous precipitate and which constitutes about 20 wt. percent of the impregnated material after the first electro-precipitation. Generally, the loaded plaques were washed and oven dried between the various electro-precipitation and formation conditioning steps. The oven drying seemed to cause flaking and loss of active material from the plaque. Improved results accrued by eliminating the application of heat in drying i.e. by drip drying.

During electrical charging, in the presence of potassium hydroxide solution the following oxidation reaction occurs:

$$2Ni(OH)_2 + 2OH^- \rightarrow 2NiOOH + 2H_2O + 2e^-$$

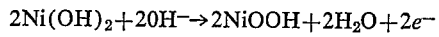

During electrical discharge, a reverse reduction reaction occurs. Intermediate formation is carried out in a caustic formation bath such as NaOH or KOH. For economic reasons NaOH is preferred. It has been found that formation, at maximum conductivity concentration, 5–35% concentration for NaOH and KOH, gives optimum current distribution in the nickel fiber electrode plaque and a minimal amount of active material loss. Best results accrue if two successive formation solution baths are used. The first formation bath or cell should be used as a sink to trap nitrate and $NH_3$. Generally the plaque will be charged (oxidized) in the first cell and charged (oxidized) and discharged (reduced) in the second cell or formation solution bath. Referring now to FIG. 2, the caustic hydroxide bath 21 contains a nickel dummy electrode 22 which is cathodic during charging and anodic during discharging and which is generally used on both sides of the loaded expansible nickel fiber plaque 23. Both are connected to respective terminals of a D.C. power supply.

The dummy cathode in the caustic formation bath is the site of the reduction of nitrate trapped in the nickel fiber plaque pores to ammonia. The ammonia, being only slightly soluble in caustic, is expelled as a gas. However, while the solution is being saturated with $NH_3$ some of the $NH_3$ reaches the $Ni(OH_2$, metallic fiber anode by diffusion, where it is preferentially oxidized back to nitrate. This prevents a complete oxidation of the $Ni(OH)_2$ to $NiOOH$ while any $NH_3$ is present in the cell. Thus it is expedient to use a current density of about 5–30 ma./sq. cm. which will reduce the nitrate at a rate fast enough that the zone around the dummy electrode is saturated with $NH_3$. This causes the $NH_3$ to be expelled before significant oxidation to nitrate at the anode can occur.

Polarity is then reversed in the formation conditioning cell, and the electrical discharge carried out at a current density of about 20 ma./sq. cm. of planar plaque surface area, until the NiOOH is almost completely reduced to $Ni(OH)_2$ and $H_2$ begins to evolve at the $Ni(OH)_2$ plaque The dummy electrode is constantly evolving $O_2$ during discharge. The important consideration here is to have a high enough current density to discharge within a reasonable time.

Figure 3:
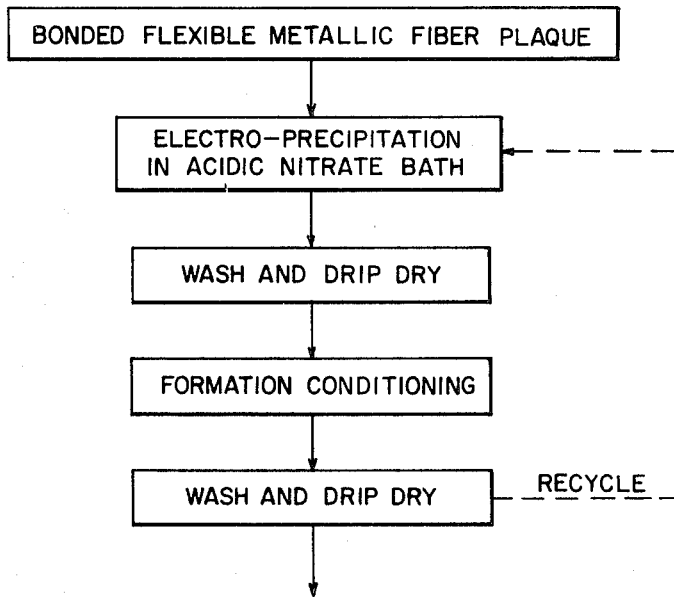
FIG. 3 shows a flow chart of loading active material in this invention.

Formation conditioning consists of any series of electrical charging (oxidizing) and/or discharging (reducing) steps in a single caustic formation solution or in a series of caustic formation solutions so as to oxidize and reduce the active material in the flexible, expansible metallic fiber plaque, thereby opening more pores in the plaque. I found it best to use a formation conditioning step between electro-precipitation steps and a final formation after the last loading, as shown in FIG. 3 by the dotted recycle path.

Generally, after the first formation conditioning in the alkaline hydroxide, the filled, nickel fiber electrode plaque is washed, dried, and reinserted into the nickel-cobalt nitrate solution for another cycle exactly similar to the first electro-precipitation cycle. My process calls preferably, for two cycles in the nitrate bath at a total time of about 5 hours, and two cycles of formation conditioning at a total time of about 24 hours.

During the intermediate formation conditioning, the flexible, expansible nickel fiber plaque is expanded. The active material in the charged form comprising NiOOH compacts against and between and becomes more adherent to the flexible nickel fibers. Consequently, the unfilled capillaries and pores in the electrode are opened up as the spongy mass stresses against the metal fibers spreading them apart.

During the formation conditioning step, the active materials increase in density and openings are formed into which more active material can be impregnated. As can be seen, the structural nature of the plaque helps determine the amount per unit colume loading of active material and thus the overall capacity of the cell in ampere hours.

EXAMPLE I

A sintered, expansible, flexible, flat nickel fiber plaque, having fibers .00046 to .00117 inch in diameter and about ⅛ inch in length was used in this process. The plaque density was 10 percent of theoretical density i.e. 90 percent porous. The plaque size for 6" x 10" x .075", giving flat, planar, plaque surface areas of 60 sq. in. Its weight was 60 grams. One edge was coined to a high density and nickel lead tabs were attached by spot welding.

This plaque was dipped slowly into a nickel nitrate-cobalt nitrate bath maintained at 15° C. by a surrounding, continuously recirculating cold water bath. The electrolyte solution contained 3400 grams of $Ni(OH_3)_2 \cdot 6H_2O$ and 170 grams of $Co(NO_3)_2 \cdot 6H_2O$ in a liter of water. This solution was 78% concentrated on a hydrated basis, had a specific gravity of about 1.574 and a pH of about 0.6.

Consumable, electrolytically deposited, nickel electrodes in parallel planes were placed two inches from both of the flat planar sides of the plaque. This consumable electrode was the anode in the electro-precipitation cell. After a five minute soak period the current was started. The current was 20 amps from a D.C. power supply with the nickel fiber plaque connected to the negative terminal and the consumable nickel electrode positive. This gave a current density of 52 ma./cm.² at the cathode. Voltage, due to the large spacing between cathode and anodes and the low electrolyte temperature, was 4 colts.

After a 22 minute current pulse, the current was turned off for a 10 minute rest period during which the pH of the electrolyte in the interior of the nickel fiber plaque became equilibrated with the electrolyte in the rest of the cell and the nickel ion concentration was restored to its initial value. Five such current pulses and rests were successively given.

After the fifth pulse, the nickel fiber plaque containing precipitate was removed and washed in hot water. The plaque was then dried in an oven at about 80° C. for about one hour. The plaque contained a deposition of bright green material identified as $Ni(OH)_2$ by leaching out the soluble phase (nickel nitrate trapped in the pores) and determining Ni content of the residue (active material). The percent Ni in the residue corresponded to that of the compound $Ni(OH)_2$.

The plaque was then inserted into a first formation cell containing a 25 percent solution of NaOH and a nickel dummy counter electrode. The expansible nickel fiber plaque was made anodic by connecting it to the positive terminal of the D.C. power supply with the dummy electrode being negative. Charging was started and gradually brought up to 8 amps during a 30 minute period. This gave a current density of about 21 ma./sq. cm. at the anode. Voltage fell from 1.6 to about 1.3, as nitrate was evolved as $NH_3$ at the dummy electrode. After 3 hours the plaque was put into a second NaOH formation cell since the initial one will now contain $NO_3^-$ and $NH_3$. Charging was brought up to 8 amps. Voltage rose from 1.6 to about 1.8 volts. At maximum voltage, the bivalent nickel hydroxide $Ni(OH)_2$ had been oxidized to the trivalent NiOOH and current went to evolve $O_2$. The charging in the second NaOH formation cell lasted for about 9 hours.

Polarity was then reversed, in the second NaOH formation cell, from the electrodes to the D.C. power supply with the nickel fiber plaque now being cathodic. The current was 5 amps discharge. The voltage between the plaque containing NiOOH and the dummy electrode started out at 0.2 volt and gradually rose to 0.5 volt at which voltage the NiOOH was almost completely reduced to $Ni(OH)_2$. Additional current went to evolve $H_2$. Discharge lasted 2.2 hours.

In the above described formation conditioning steps, the nickel fiber battery plaque containing $Ni(OH)_2$ was removed from the original NaOH bath after 3 hours electrical charging. This first caustic solution was loaded with nitrate and $NH_3$ and was used as an initial charging formation solution in subsequent cycles. The plaque was immersed in a fresh NaOH formation cell to complete charging. Then the plaque was discharged. This formation conditioning step is very important to open up the plaque pores and compact the active material between the flexible nickel fibers so as to additionally load the plaque to the maximum limit. The electrode plaque was washed in hot water, oven dried for one hour at 80° C., and reinserted into the nickel nitrate electrolyte salt solution of the electro-precipitation cell for another cycle exactly similar to the first electro-precipitation cycle described above (5 current pulses and rests).

Then, after the fifth current pulse-rest cycle in the electro-precipitation cell, the nickel fiber electrode plaque was removed, washed, oven dried for one hour at 80° C., and replaced in the first $NO_3^-$, $NH_3$ contaminated formation cell.

After forming or oxidizing for 3 hours in this first cell, the plaque was inserted into the second NaOH formation cell for about 9 hours as before. The electrode was again discharged as before, by reversing the polarity of the D.C. power supply. Discharge here lasted 4.4 hours. The loaded plaque was then washed in hot water, oven dried and weighed.

This process involved two cycles in the nitrate electrolyte solution at a total time of about 5 hours and two cycles in the formation solutions at about 14½ hours each (3 hours charging in the first formation solution, 9 hours charging and about 2½ to 4 hours discharging in the second formation solution). Another cycle in the nitrate and formation solutions would have probably loaded additional active material.

Following the voltage as a function of time on a voltmeter, it was determined that 11 ah. (ampere-hours) was the loaded nickel fiber electrode plaque capacity after the first formation conditioning step, and that final capacity was up to 22 ah. Final weight of the electrode plaque was 179.9 grams, giving a net weight gain of 119.9 grams. This is approximately 0.183 ah./gram and a capacity of 0.37 ah./sq. in. of plaque area or 5.7 ah./sq. decimeter for a plaque thickness of about 1.9 mm.

Final ampere-hour capacity was double that of the interim capacity, indicating that the electro-precipitation efficiency had not decreased for second loading. This indicates that additional loading is possible with correspondingly higher ah./sq. decimeter values.

No additional salt solution was needed to maintain the acid pH of the electro-precipitation bath, as about 70 percent of the nickel anode went into solution. Also, using this process it is possible to load expansible electrode plaques on the order of 10 mm. thickness or higher with acetive material due to the intermediate formation conditioning step in conjunction with the use of flexible, expansible, plaques.

EXAMPLE II

Sintered, expansible, flexible nickel fiber plaques as in Example I were used in this example. They were used as a rack of 15 plaques in parallel with consumable nickel anodes therebetween. The spacing was about one inch between the anodes and the plaques.

The nickel nitrate-cobalt nitrate solution composition and concentration was the same as in Example I. The current used was 300 amps per rack giving 20 amps per plaque. The electro-precipitation was otherwise similar to that of Example I.

After the electro-precipitation, the nickel fiber plaques containing precipitate were removed, washed in hot water and allowed to dry by drainage only. I found that drying in an oven as in Example I tended to cause loss of precipitate.

The plaques were then formation conditioned as in Example I except that charging was carried out at 60 amps per rack giving 4 amps per plaque and a current density of about 11 ma./sq. cm. per plaque. Discharging was at 100 amps per rack giving 6.7 amps per plaque until the voltage rose to 0.5 volt. This indicated an average capacity of 18.9 ah. per plaque. Discharge lasted 2.8 hours. As in Example I the electro-precipitation and formation steps were repeated. In the second electro-precipitation I used 20 amps per plaque with a reduction in the number of current pulses from 5 to 4 pulses. Charging was again at 4 amps per plaque and discharging was at 6.7 amps per plaque and continued until voltage rose to 0.5 volt. This indicated an average capacity of 27.6 ah. per plaque after the second formation conditioning. Discharge lasted 4.1 hours. This is approximately a capacity of 0.46 ah./sq. in. or 7.1 ah./sq. decimeter. These capacity values were substantiated by bench testing of individual electrodes.

I claim as my invention:

1. A method of loading porous, flexible, expansible metallic battery plaques with active material comprising the steps of:
   (a) immersing a porous, flexible, expansible metallic fiber plaque and a consumable nickel electrode in an electrolyte solution consisting essentially of nickel nitrate having a temperature below about 30° C. and a pH between about 0.5 and 1.1, and then
   (b) making the plaque cathodic and the consumable nickel electrode anodic and supplying between about 20 to 100 ma./sq. cm. of plaque surface area to the plaque to precipitate active material comprising bivalent nickel hydroxide within the plaque pores, and then
   (c) electrochemically oxidizing and reducing the active material in alkaline hydroxide solution, to expand the fiber plaque and open pores within the plaque containing said active material, and then
   (d) repeating step (b) to the product of step (c) in an electrolyte solution consisting essentially of nickel nitrate having a temperature below about 30° C. and a pH between about 0.5 and 1.1.

2. The method of claim 1 wherein the current in step (b) is supplied to the plaque in current pulses with rest periods therebetween.

3. The method of claim 1 wherein the active material is oxidized in step (c) in a first alkaline hydroxide solution and then oxidized and reduced in step (c) in a second alkaline hydroxide solution.

4. The method of claim 1 wherein the plaque is washed and dried without heat between steps (b) and (c) and between steps (c) and (d).

5. The method of claim 1 wherein the plaque comprises bonded metallic fibers, said plaque having a density between 5 and 25 percent of theoretical density.

6. The method of claim 5 wherein the electrolyte solution also contains cobalt nitrate.

7. The method of claim 5 wherein the plaque is flat and the fibers are between about 0.0002 and 0.003 inch in diameter.

8. The method of claim 7 wherein the alkaline hydroxide solution of step (c) is a 5 to 35 percent concentrated solution selected from the group consisting of KOH and NaOH.

9. The method of claim 7 wherein the electrochemical oxidation of step (c) is carried out at a current density of about 5 to 30 ma./sq. cm.

10. The method of claim 7 wherein step (c) is repeated after step (d).

References Cited

UNITED STATES PATENTS

| 3,108,910 | 10/1963 | Herold | 136—29 |
| 3,184,338 | 5/1965 | Mueller | 136—76 |
| 3,214,355 | 10/1965 | Kandler | 204—56 |
| 3,248,266 | 4/1966 | Rampel | 136—29 |
| 3,274,028 | 9/1966 | O'kinaka et al. | 136—29 |
| 3,335,033 | 8/1967 | Kober | 136—76 |
| 3,442,710 | 5/1969 | Menard | 136—76 |
| 3,455,741 | 7/1969 | Schneider | 136—29 |
| 3,466,231 | 9/1969 | MacArthur | 204—56 |

WINSTON A. DOUGLAS, Primary Examiner

C. F. LE FEVOUR, Assistant Examiner

U.S. Cl. X.R.

136—29; 204—56